US012676740B2

(12) United States Patent
Kon et al.

(10) Patent No.: US 12,676,740 B2
(45) Date of Patent: Jul. 7, 2026

(54) SYSTEMS AND METHODS FOR QUANTUM POSITION-BASED KEY EXCHANGE

(71) Applicant: JPMORGAN CHASE BANK, N.A., New York, NY (US)

(72) Inventors: Wen Yu Kon, Singapore (SG); Ignatius William Primaatmaja, Singapore (SG); Kaushik Chakraborty, Singapore (SG); Ci Wen Lim, Singapore (SG); Marco Pistoia, Amawalk, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 75 days.

(21) Appl. No.: 18/955,677

(22) Filed: Nov. 21, 2024

(65) Prior Publication Data

US 2026/0155961 A1      Jun. 4, 2026

(51) Int. Cl.
| | |
|---|---|
| *H04B 10/70* | (2013.01) |
| *H04L 9/08* | (2006.01) |
| *H04L 9/14* | (2006.01) |
| *G06F 21/31* | (2013.01) |

(52) U.S. Cl.
CPC .......... *H04L 9/0852* (2013.01); *H04L 9/0819* (2013.01)

(58) Field of Classification Search
None
See application file for complete search history.

(56) References Cited

U.S. PATENT DOCUMENTS

| | | | | |
|---|---|---|---|---|
| 2012/0195597 A1* | 8/2012 | Malaney | ............... | H04W 12/10 |
| | | | | 398/115 |
| 2016/0241396 A1* | 8/2016 | Fu | ........................ | H04L 9/0836 |
| 2016/0359623 A1* | 12/2016 | Unruh | ................... | H04L 9/3271 |
| 2017/0033926 A1* | 2/2017 | Fu | ........................ | H04L 63/061 |
| 2019/0305941 A1* | 10/2019 | Fu | ........................ | H04L 63/061 |

FOREIGN PATENT DOCUMENTS

WO      WO-2015118179 A1 *      8/2015      ........... H04L 9/3271

OTHER PUBLICATIONS

Privacy-Preserving Location-Based Services Query Scheme Against Quantum Attacks. Hu et al. IEEE. (Year: 2020).*
Free-space reconfigurable quantum key distribution network. Qi et l. IEEE. (Year: 2015).*

(Continued)

*Primary Examiner* — Venkat Perungavoor
(74) *Attorney, Agent, or Firm* — GREENBERG TRAURIG LLP

(57)      ABSTRACT

A method may include: a first verifier receiving a request for a claimed position verification from a prover; the first verifier randomly generating a first bitstring and a second bitstring; the first verifier sending the first bitstring and the second bitstring to a second verifier; the first verifier preparing a quantum system and sending the quantum system to the prover; the first verifier sending the first bitstring to the prover; the second verifier sending the second bitstring to the prover such that the first bitstring and the second bitstring arrive at the claimed position at the same time; the first verifier validating a response received from the prover; and the first verifier confirming that the response was received within an expected time window.

20 Claims, 8 Drawing Sheets

(56) References Cited

OTHER PUBLICATIONS

Chandran, Nishanth; et al., Classical Position-based Cryptography: Position based cryptography. In Annual International Cryptology Conference, pp. 391-407, 2009.

Allerstorfer, Rene; et al., Quantum Position Verification: Making existing quantum position verification protocols secure against arbitrary transmission loss. arXiv preprint arXiv:2312.12614, 2023.

Bluhm, Andreas; et al., Quantum Position Verification: A single-qubit position verification protocol that is secure against multi-qubit attacks. Nature Physics 18, pp. 623-626, 2022.

Escolà-Farràs, Llorenc; et al., Quantum Position Verification: Single-Qubit Loss-Tolerant Quantum Position Verification Protocol Secure against Entangled Attackers. Physical Review Letters 131, pp. 140802, 2023.

* cited by examiner

Second Verifier (120)

122

Prover Quantum Device (134)

Quantum Prover (130)

132

First Verifier Quantum Device (114)

First Verifier (110)

112

155

140

152

150

100

SYSTEMS AND METHODS FOR QUANTUM POSITION-BASED KEY EXCHANGE

BACKGROUND OF THE INVENTION

1. Field of the Invention

Embodiments relate to systems and methods for quantum position-based key exchange.

2. Description of the Related Art

The physical location, or position, of an entity can serve as a useful credential that is difficult to impersonate. For instance, verifying that a bank server that one is communicating with is located within the bank's data center allows one to confidently certify the identity of the server without having to pre-share any secrets. Moreover, position-based identification can provide anonymity, for instance allowing a client to be granted access to a server based on the location (e.g., within an office), without requiring the client to reveal his/her identity.

Without quantum communication, classical position verification or position-based key exchange protocol requires the assumption of the bounded retrieval model, which essentially acts as a limit to the amount of classical information the adversary can store. The use of quantum communication affords the protocol properties that are not achievable with classical communication alone.

Having a bound on the classical memory size is an impractical assumption today, where commercial devices such as hard drives can store data beyond terabyte sizes. Using quantum communication allows for the adversary to have unbounded classical memory, but requires them to have bounded quantum entanglement. Since quantum information cannot be easily stored, at least in the near-term, this assumption on bounded quantum storage is more reasonable.

Further, the quantum communication steps provide an avenue for information-theoretic secure key exchange-similar to quantum key distribution. This is not possible in the classical regime, without limits placed on the classical memory sizes of the adversaries.

SUMMARY OF THE INVENTION

Systems and methods for quantum position-based key exchange are disclosed. In one embodiment, a method may include: receiving, by a first verifier electronic device, a request for position verification comprising a claimed position from a prover electronic device; randomly generating, by the first verifier electronic device, a first bitstring and a second bitstring; sending, by the first verifier electronic device, the first bitstring and the second bitstring to a second verifier electronic device; preparing, by the first verifier electronic device, a quantum system using a computed basis from an evaluation function, the first bitstring, and the second bitstring; sending, by the first verifier electronic device, the quantum system to the prover electronic device; sending, by the first verifier electronic device, the first bitstring to the prover electronic device, wherein the second verifier electronic device is configured to send the second bitstring to the prover electronic device such that the first bitstring and the second bitstring are sent to arrive at the claimed position at the same time; validating, by the first verifier electronic device, a response received from the prover electronic device; confirming, by the first verifier electronic device, that the response was received within an expected time window, wherein the expected time window is based on the claimed position of the prover electronic device; wherein the first verifier electronic device rejects the request in response to the response being not valid or the response being received outside of the expected time window.

In one embodiment, the method may also include: performing, by the first verifier electronic device and with the second verifier electronic device, parameter estimation, wherein the parameter estimation may include estimating an error rate and a loss.

In one embodiment, the method may also include: generating, by the first verifier electronic device, a first verifier raw key; generating, by the prover electronic device, a prover raw key; performing, by the first verifier electronic device and the prover electronic device, one-way error correction based on the first verifier raw key and the prover raw key; obtaining, by the first verifier electronic device, a first verifier secret key and a first verifier acknowledgement key from the first verifier raw key; and obtaining, by the prover electronic device, a prover secret key and a prover acknowledgement key from the prover raw key.

In one embodiment, the method may also include: sending, by the prover electronic device, the prover acknowledgement key to the first verifier electronic device; and forming, by the first verifier electronic device and the prover electronic device, a key pair from the first verifier secret key and the prover secret key in response to the prover acknowledgement key matching the first verifier acknowledgement key.

In one embodiment, the prover electronic device measures the quantum system in a basis computed from the first bitstring and the second bitstring using the evaluation function and sends the measurement outcome to the first verifier electronic device and the second verifier electronic device.

In one embodiment, the quantum system may further include a phase-randomized BB84 state with no correlation between different photon numbers.

In one embodiment, the method may also include: randomly generating, by the first verifier electronic device, a random bit value, wherein the random bit value may be used to prepare the quantum system.

According to another embodiment, a method may include: receiving, by a third party electronic device, a request for position verification comprising a claimed position from a prover electronic device; randomly generating, by the third party electronic device, a first bitstring and a second bitstring; sending, the third party electronic device, the first bitstring and the second bitstring to a first verifier electronic device and a second verifier electronic device; preparing, by the third party electronic device, a quantum system using a computed basis from an evaluation function, the first bitstring, and the second bitstring; sending, by the third party electronic device, the quantum system to the prover electronic device; sending, by the first verifier electronic device, the first bitstring to the prover electronic device; sending, by the second verifier electronic device, the second bitstring to the prover electronic device, wherein the first bitstring and the second bitstring are sent to arrive at the claimed position at the same time; validating, by the first verifier electronic device and the second verifier electronic device, a response received from the prover electronic device; and confirming, by the first verifier electronic device with the second verifier electronic device, that the response was received within an expected time window, wherein the expected time window is based on the claimed position of the prover electronic device; wherein the first verifier electronic device rejects the request in response to the response being invalid or the response being received outside of the expected time window.

In one embodiment, the method may also include: determining, by the third party electronic device, that an error rate is within a tolerance value.

In one embodiment, the method may also include: generating, by the third party electronic device, a third party raw key; generating, by the prover electronic device, a prover raw key; performing, by the third party electronic device and the prover electronic device, one-way error correction based on the third party raw key and the prover raw key; obtaining, by third party electronic device, a third party secret key and a third party acknowledgement key from the third party raw key; and obtaining, by the prover electronic device, a prover secret key and a prover acknowledgement key from the prover raw key.

In one embodiment, the method may also include: sending, by the prover electronic device, the prover acknowledgement key to the third party electronic device; and forming, by the third party electronic device and the prover electronic device, a key pair from the third party secret key and the prover secret key in response to the prover acknowledgement key matching the third party acknowledgement key.

In one embodiment, the prover electronic device measures the quantum system in a basis computed from the first bitstring and the second bitstring using the evaluation function and sends the measurement outcome to the first verifier electronic device and the second verifier electronic device.

In one embodiment, the method may also include: randomly generating, by the third party electronic device, a random bit value, wherein the random bit value may be used to prepare the quantum system.

According to another embodiment, a system may include: a first verifier electronic device executing a first verifier computer program; a second verifier electronic device executing a second verifier computer program; and a prover electronic device executing a prover computer program. The first verifier computer program is configured to receive a request for position verification comprising a claimed position from the prover computer program; the first verifier computer program is configured to randomly generate a first bitstring and a second bitstring; the first verifier computer program is configured to send the first bitstring and the second bitstring to the second verifier computer program; the first verifier computer program is configured to prepare a quantum system using a computed basis from an evaluation function, the first bitstring, and the second bitstring; the first verifier computer program is configured to send the quantum system to the prover computer program; the first verifier computer program is configured to send the first bitstring to the prover computer program; the second verifier computer program is configured to send the second bitstring to the prover computer program, wherein the first bitstring and the second bitstring are sent to arrive at the claimed position at the same time; the first verifier computer program and the second verifier computer program are configured to validate a response received from the prover computer program; and the first verifier computer program and the second verifier computer program are configured to verify that the response was received within an expected time window; wherein the first verifier computer program or the second verifier computer program is configured to reject the request in response to the response being not valid or the response being received outside of the expected time window.

In one embodiment, the first verifier computer program and the second verifier computer program are configured to perform parameter estimation, wherein the parameter estimation may include estimating an error rate and a loss.

In one embodiment, the first verifier computer program may be configured to generate a first verifier raw key; the prover computer program may be configured to generate a prover raw key; the first verifier computer program and the prover computer program are configured to perform one-way error correction based on the first verifier raw key and the prover raw key; the first verifier computer program may be configured to obtain a first verifier secret key and a first verifier acknowledgement key from the first verifier raw key; and the prover computer program may be configured to obtain a prover secret key and a prover acknowledgement key from the prover raw key.

In one embodiment, the prover computer program may be configured to send the prover acknowledgement key to the first verifier computer program; and the first verifier computer program and the prover computer program are configured to form a key pair from the first verifier secret key and the prover secret key in response to the prover acknowledgement key matching the first verifier acknowledgement key.

In one embodiment, the prover computer program may be configured to measure the quantum system in a basis computed from the first bitstring and the second bitstring using the evaluation function; and the prover computer program may be configured to send the measurement outcome to the first verifier computer program and the second verifier computer program.

In one embodiment, the first verifier computer program may be configured to randomly generate a random bit value, wherein the random bit value may be used to prepare the quantum system.

In one embodiment, the quantum system further may include a phase-randomized BB84 state with no correlation between different photon numbers.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments relate to systems and methods for quantum position-based key exchange.

Known protocols for secure quantum position verification can only achieve a single task: verify the position of a single party. Embodiments may build upon the secure quantum position verification protocol to achieve a different cryptographic task-position-based key exchange. In addition to using the quantum communication in quantum position verification to verify the location of a party, embodiments may use the same communication to exchange keys between parties. The exchange of a key with a party with a known position (with the known position acting as a certification of the party's identity) allows further tasks such as the exchange of secret communications or authenticating messages, significantly extending the application beyond simply certifying the position.

Figure 1:
FIG. 1 illustrates a system for quantum position-based key exchange according to an embodiment.

Referring to FIG. 1, a system for quantum position-based key exchange is disclosed according to an embodiment. System 100 may include first verifier 110 and second verifier 120. In one embodiment, verifiers 110 and 120 may be electronic devices, such as servers, computers, etc. Verifiers 110 and 120 may be at known geographical locations, such as data centers or satellites.

First verifier 110 may execute first verifier computer program 112, and second verifier 120 may execute second verifier computer program 122.

First verifier 110 and second verifier 120 may communicate via secure private communication channel 140. For example, secure private communication channel 140 may include a fiber channel, a satellite link, a virtual private network (VPN), etc.

First verifier 110 may have access to first verifier quantum device 114, such as a BB84 source, an entanglement source (e.g., a spontaneous parametric down conversion source), etc.

Prover 130 may be a classical electronic device, such as a server, a computer, etc., that has access to prover quantum device 134, such as a quantum measurement device, such as photon-number resolving detectors, BB84 measurement devices, etc. Prover 130 may seek to prove its location (i.e., location P) to first verifier 110 and second verifier 120. Prover 130 may be substantially colinearly located with first verifier 110 and second verifier 120.

Prover may execute prover computer program 132.

First verifier 110 and second verifier 120 may communicate with prover 130 using first communication channel 150 and second communication channel 155, respectively. First communication channel 150 and second communication channel 155 may be any suitable classical communication channel, preferably with low latency.

First communication channel 150 and second communication channel 155 may also support one-way authentication, where prover 130 may authenticate messages originating from the first verifier 110 and second verifier 120, respectively.

First verifier quantum device 114 and prover quantum device 134 may communicate via quantum supported communication channel 152, which may be any suitable communication channel that supports quantum communications, such as a direct fiber connection, a satellite link, etc.

Figure 2A:
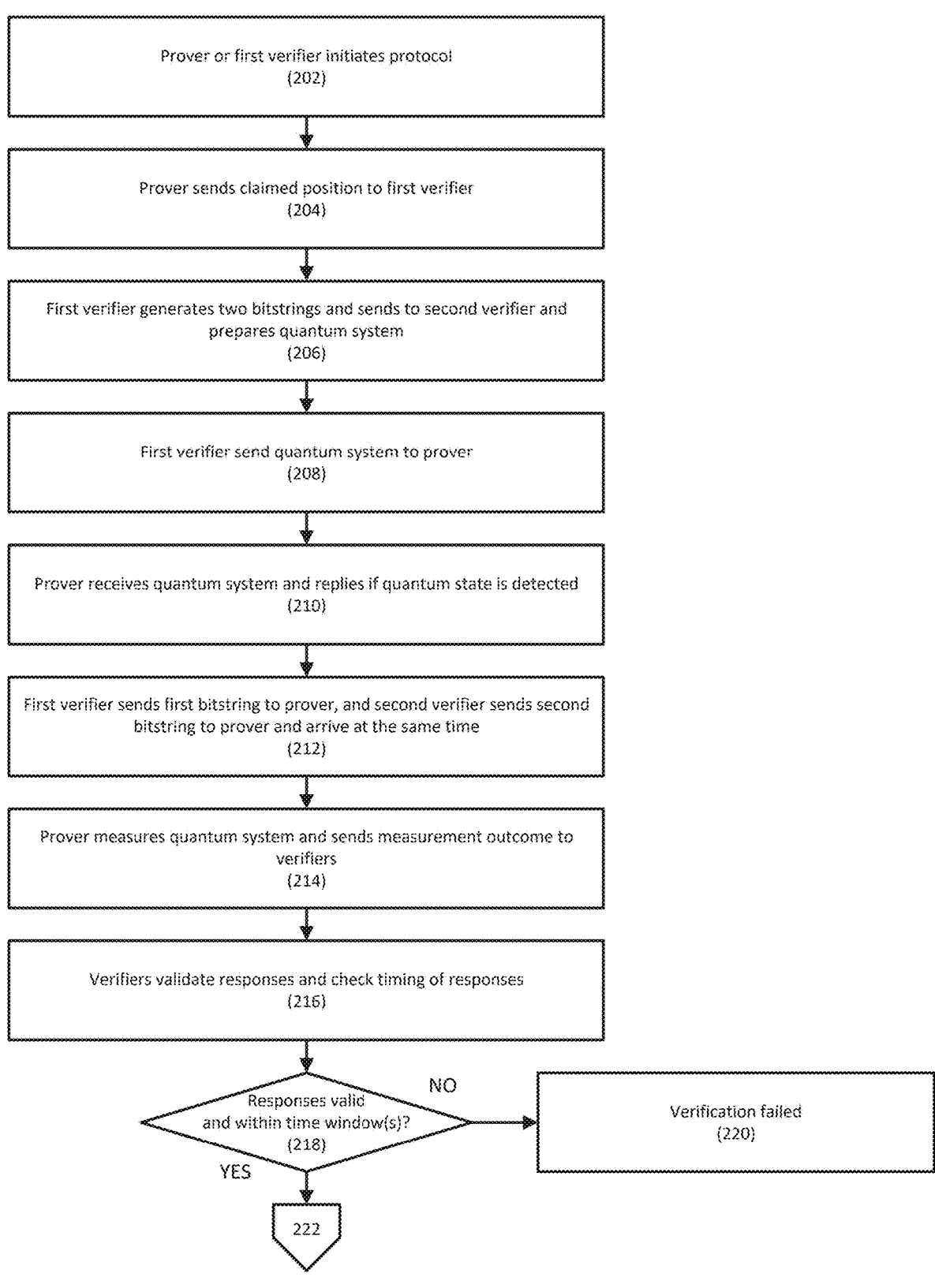
FIGS. 2A and 2B illustrate a method for quantum position-based key exchange according to an embodiment.
Figure 2B:
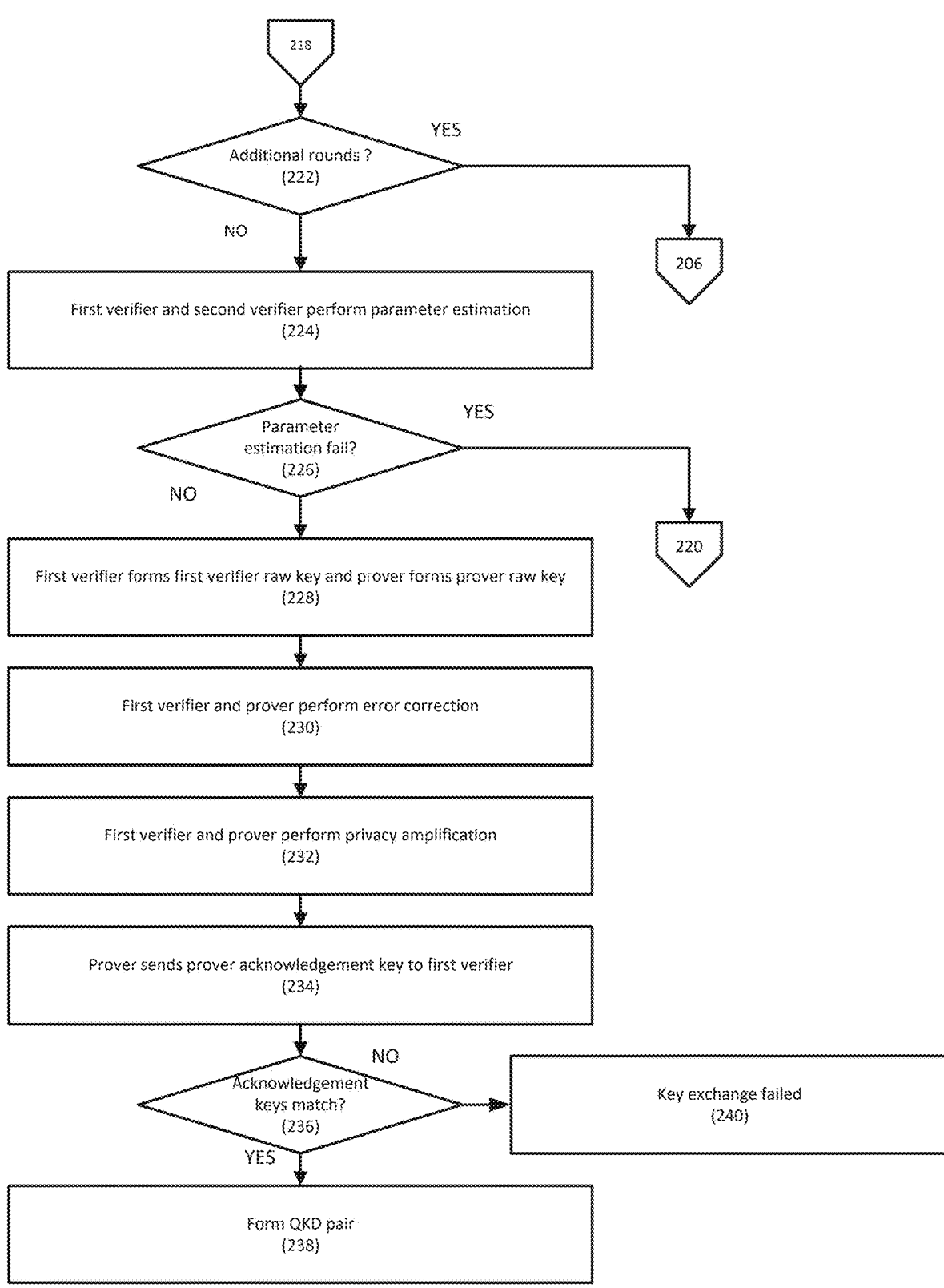

Referring to FIGS. 2A and 2B, a method for quantum position-based key exchange is disclosed according to an embodiment.

In step 202, a prover or a first verifier may initiate a quantum position-based key exchange protocol. For example, the initiating party may send a hello message from to the target party (e.g., from the prover to the first verifier)

to begin the protocol, and the target party may respond with a hello message to indicate that it is ready to begin the protocol.

In step 204, the prover may send a request for position verification and its claimed position, P, to the first verifier. The claimed position, P, is the location that the prover is seeking to have verified.

In step 206, the first verifier may randomly generate two bitstrings, x' and y', as evaluation function inputs, and a random bit value z for state preparation. The first verifier may send both bitstrings x' and y' to a second verifier using a secure communication channel.

For example, the evaluation function may be a function that takes as input two bitstrings, x' and y', and outputs two bit values, $\theta$ and T, which are used as the basis choice and testing parameter, respectively. The evaluation function may have the property that knowing one of the input bitstrings is insufficient to guess the outputs accurately. Examples of the evaluation function include hash functions, inner product functions and random functions.

The first verifier and the second verifier may agree on the timing to send the bitstrings x' and y', respectively, to the prover so that they arrive at the claimed position at the same time.

The first verifier may also prepare a quantum system. A quantum system is a system that behaves according to the principles of quantum mechanics. A quantum system can be prepared in a quantum state, and its properties can be measured by a quantum measurement device. A quantum state has unique properties not observed in classical states, such as quantum superposition, interference, and entanglement.

For example, the first verifier may compute the basis, $\theta$, from the evaluation function using the bitstrings, $(\theta, T) = f$ (x', y'), and may prepare a quantum system Q in the BB84 state with basis $\theta$ and bit value z.

In another embodiment, the first verifier may prepare a quantum system Q in the BB84 state with a fixed or random basis and bit value z.

In embodiments, the quantum system Q may be generated from a single-photon source, such as a quantum dot or an atom, which has some initial fixed quantum state (for example in a horizontal polarization). The quantum system generated may be prepared in the BB84 state in the polarization encoding by performing a rotation of the quantum system using a polarization rotator (e.g., half-wave plates), with the choice of rotation angle dependent on the basis and bit value.

Because preparing single-qubit (or single-photon) BB84 states is difficult to achieve in practice, embodiments may use decoy state analysis as an alternative to preparing single-photon BB84 state.

For example, instead of sending single-photon BB84 states, the first verifier may send phase-randomized BB84 states with some intensity. The phase randomized BB84 state may be generated by a quantum source, such as a gain-switching laser that generates short pulses with randomized phases. This gives rise to a specific class of quantum states where there is no correlation between different photon numbers, which is necessary to perform decoy state analysis.

By sending quantum system Q in this state, there will be some rounds that are single-photon rounds and thus secure. To estimate various parameters in these single-photon rounds (e.g., loss, error rate), phase-randomized BB84 states may be sent with different intensities, and the observations of the parameters at the various intensities allow for the estimation of the parameters of the single-photon rounds.

The intensity (i.e., the average number of photons) of the laser source may be manually adjusted. This may be done using an intensity modulator placed after the laser source. In general, three different intensity values may be chosen, and for each quantum system, one of the three intensities may be randomly selected in order to prepare the quantum system. The observations of the parameters at the different intensities may be used to estimate the parameters of the single-photon rounds.

In step 208, the first verifier may send the quantum system to the prover. For example, the quantum system may be sent to the prover over a communication channel that supports quantum communications, such as a fiber optic. The quantum system may be sent as multiple photons.

In step 210, the prover may receive the quantum system and may reply to the first verifier if the quantum system has arrived. The prover keeps the quantum system in its quantum memory. An example of a suitable quantum memory is a delay line.

For example, the prover may perform a measurement to check if the quantum system has been received. The prover records that the quantum system has been received if there is a successful detection, otherwise, it records that the quantum system is lost. The prover informs both verifiers immediately/quickly whether the quantum system is received or lost.

In step 212, the first verifier may send the first bitstring x', to the prover via a communication channel supporting one-way authentication, and the second verifier may send the second bitstring y', to the prover via a communication channel supporting one-way authentication using the agreed-upon timing.

In step 214, the prover may measure the quantum system and may record the measurement outcome. For example, the prover may measure the quantum system with the first bitstring x' and the second bitstring y', and may send responses to the first verifier and the second verifier with the measurement outcome.

The prover may compute the basis and testing parameter using the evaluation function and the two bitstrings [(θ, T)=f'(x', y')]. It may measure the quantum system Q in the computed basis θ, and may record the measurement outcome.

The basis describes the choice of the quantum measurement and quantum state preparation. For example, the preparation of a quantum system with a polarization quantum state can be in the rectilinear basis, to prepare the quantum system either in the horizontal or vertical polarization, or in the circular basis, to prepare the quantum system either in the left-circular or right-circular polarization.

If no detection is made, the prover may send a "no detection" message to the first verifier and the second verifier immediately/quickly.

If the testing parameter indicates a test round (e.g., T=1), the prover may send the measurement outcome to both verifiers immediately/quickly.

If the testing parameter indicates a key generation round (e.g., T=0), the measurement outcome is not sent.

In step 216, the first verifier and the second verifier may validate the response that they received, and may verify that the responses were received within expected time window (s). The expected time window(s) may be based on the distance between the verifiers and the claimed location of the prover, P, and may differ.

The responses are considered valid if (1) the responses received by the two verifiers match, and (2) the responses are as expected given the testing parameter and detection response (e.g., if T=0, there should not be a response, and if $b_{det}=0$, the response is expected to be "no detection").

In step 218, if the responses are not valid or are not received within the time window(s), in step 220, the verification may fail.

If the responses are valid and received within the time window(s), and, in step 222, the number of rounds does not exceed a target number, the process may return to step 206, where the first verifier may prepare a second quantum system.

If the number of rounds reaches a target number, in step 224, the first verifier and the second verifier may perform parameter estimation. For example, the first verifier and the second verifier may estimate the errors/loss and determine if they are acceptable values for key generation.

In one embodiment, the first verifier and the second verifiers may estimate the error rate or score, and loss in the rounds in which the first verifier sends a single photon. The estimates may be computed from the number of detected rounds for each intensity value and the error rates of these rounds for each intensity value.

In another embodiment, the first verifier and the second verifiers may estimate the overall error rate or score and a loss, which may be directly obtained from the number of detected rounds and the error rate in these rounds (e.g., loss is number of rounds with no detection divided by total number of rounds).

In step 226, if the parameter estimation fails, in step 220, the verification may fail.

If parameter estimation passes, in step 228, the first verifier may form a first verifier raw key, and the prover may form a prover raw key. For example, the first verifier may collect the bit values z of the key generation rounds where a detection is made into a verifier raw key, $S_C$, while the prover collects its measurement outcomes z' of the key generation rounds where a detection is made into a prover raw key $S_P$.

In step 230, the first verifier and the prover may perform one-way error correction to correct for errors between the first verifier and the prover raw keys. For example, the first verifier may compute a syndrome $$syn = f_{syn}^{enc}(S_C)$$

and may send the syndrome to the prover via a communication channel supporting one-way authentication. The prover may compute a corrected prover key using the syndrome, $$\hat{S}_P = f_{syn}^{dec}(S_P, syn).$$

In step 232, the first verifier and the prover may perform privacy amplification. For example, the first verifier may perform privacy amplification on the first verifier raw key to obtain a first verifier secret key and a first verifier acknowledgement key, and the prover may perform privacy amplification on the corrected prover key to obtain a prover secret key and prover acknowledgement key.

In one embodiment, the privacy amplification may be performed using a quantum-proof strong extractor. For example, the first verifier may send a randomly chosen extractor seed to the prover via a communication channel supporting one-way authentication. The first verifier may use a quantum-proof strong extractor with an extractor seed and the first verifier raw key as inputs to compute a first verifier secret key and a first verifier acknowledgement key. The prover may use a quantum-proof strong extractor with an extractor seed and corrected prover key as inputs to compute a prover secret key and prover acknowledgement key.

In step 234, the prover may send the prover acknowledgement key to the first verifier to indicate that it has successfully generated the prover secret key.

In step 236, the first verifier checks if the prover acknowledgement key matches the first verifier acknowledgement key. If they match, in step 238, the first verifier secret key and the prover secret key form a quantum key distribution (QKD) key pair.

If the acknowledgement keys do not match, in step 240, the key exchange may fail.

Figure 3:
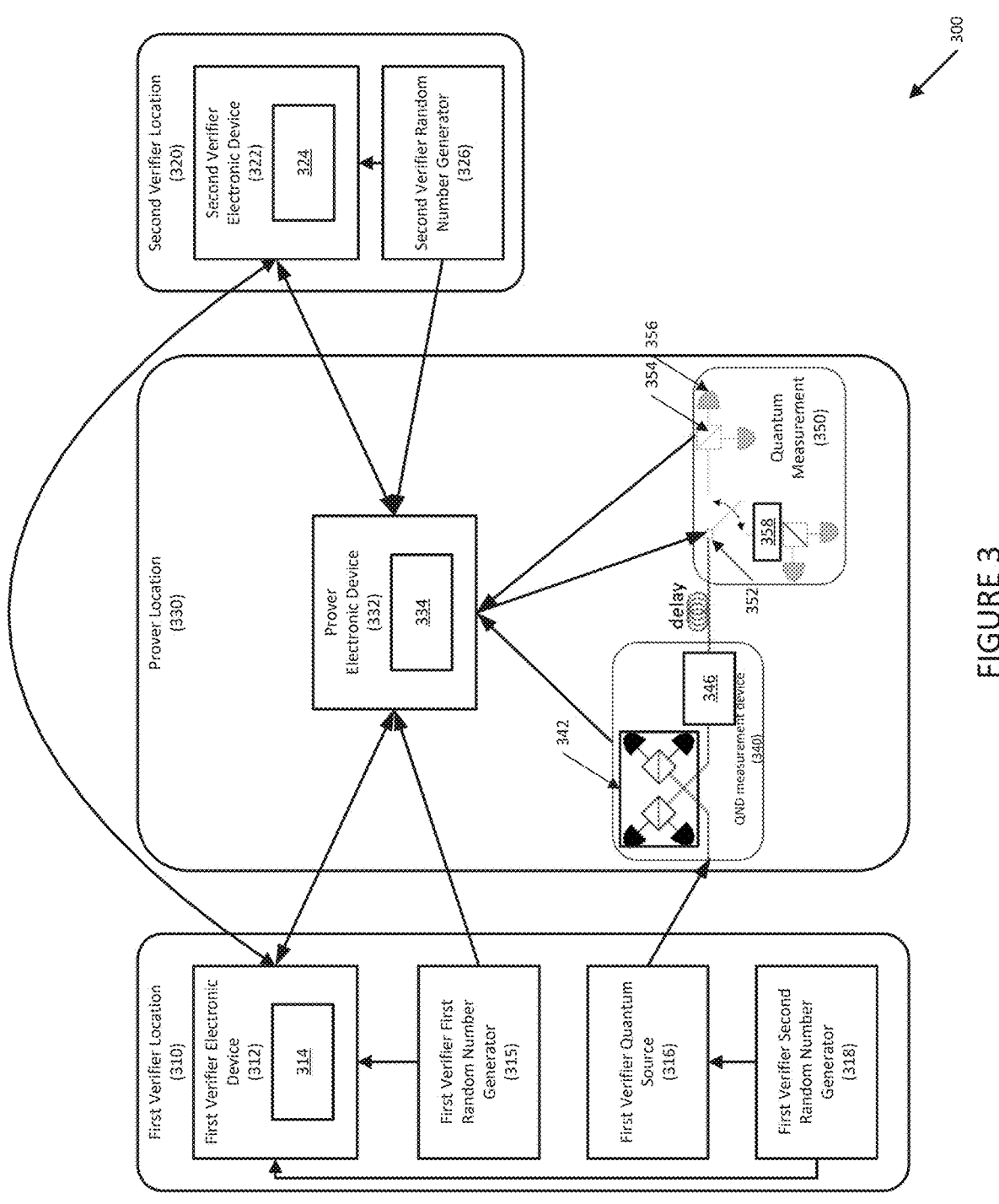
FIG. 3 illustrates a system for quantum position-based key exchange according to another embodiment.

FIG. 3 depicts an exemplary implementation of a system for quantum position-based key exchange is disclosed according to another embodiment. System 300 may include first verifier location 310, which may be a physical location for the first verifier that may include first verifier electronic device 312 executing first verifier computer program 314, first verifier first random number generator 315, first verifier quantum source 316, and first verifier second random number generator 318.

System 300 may further include second verifier location 320, which may be a physical location for the second verifier that may include second verifier electronic device 322 executing second verifier computer program 324, and second verifier random number generator 326.

System 300 may also include prover location 330, which may include prover electronic device 332 executing prover computer program 334, quantum non-demolition measurement device (QND) 340, and quantum system measurement device 350.

QND 340 may include Bell-state measurement device 342 that may include polarizing beam splitters and threshold single-photon detectors. It may further include spontaneous parametric down-conversion (SPDC) source 346, which may be a source of entangled quantum systems. SPDC source 346 may generate quantum systems A and B which are entangled, with quantum system A sent to the Bell-state measurement device 342 and quantum system B sent to the delay line. The delay line may include, for example, a long optical fiber. The length of the optical fiber may be based on the timing delay required between the time when the quantum systems A and B are generated, and the time when quantum system B is measured.

The delay line acts as a quantum memory and keeps quantum system B until it is ready to be measured when both bitstrings arrive from the verifiers.

Quantum system measurement device 350 may perform a BB84 protocol measurement on quantum system B.

Quantum system Q may be a quantum system that is sent from first verifier quantum source 316 to QND 340.

Quantum system measurement device 350 may include optical switch 352, polarizing beam splitters 354, threshold single-photon detectors 356, and half-wave plate (HWP) 358. Quantum system measurement device 350 may use a specific method of implementing BB84 measurement for quantum systems that use polarization encoding.

Optical switch 352 receives the basis as input and selects which basis to measure the quantum system. One arm of the switch goes to a setup to measure in basis 0 and the other arm goes to a setup to measure in basis 1.

HWP 358 may rotate the polarization of the incoming signal/photon. By placing HWP 358 at this location, the measurement is converted to a measurement on basis 1 (without HWP 358, this measurement is measured in basis 0).

Figure 4:
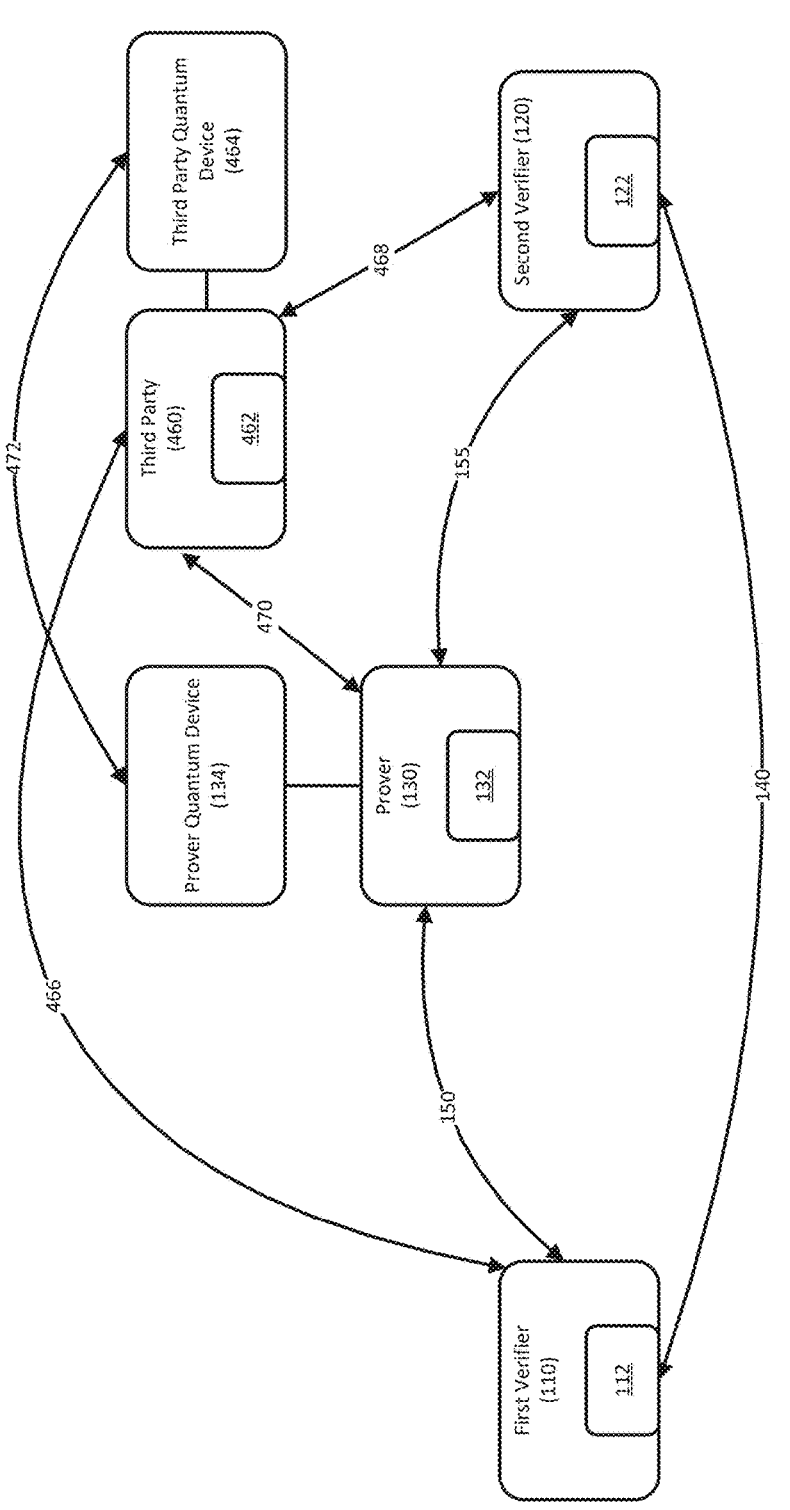
FIG. 4 illustrates a system for quantum position-based key exchange using a location credential according to another embodiment.
Figure 4:

FIG. 4 illustrates a system for quantum position-based key exchange using a location credential according to another embodiment. System 400 may include similar elements as in FIG. 1, as well as third party 460. Third party 460 may be a classical electronic device, such as a server, a computer, etc., that has access to quantum device 464.

Third party 460 may communicate with prover 130 using classical commutation channel 470, which may be similar to communication channel 150. Third party quantum device 464 may communicate with prover quantum device 134 via quantum supported communication channel 472, which may be any suitable communication channel that supports quantum communications, such as a direct fiber connection, a satellite link, etc.

Third party 460 may execute third party computer program 462.

Third party 460 may communicate with first verifier 110 via classical commutation channel 466, and with second verifier 120 via classical commutation channel 468. Classical communication channels 466 and 468 may be secure communication channels.

Figure 5A:
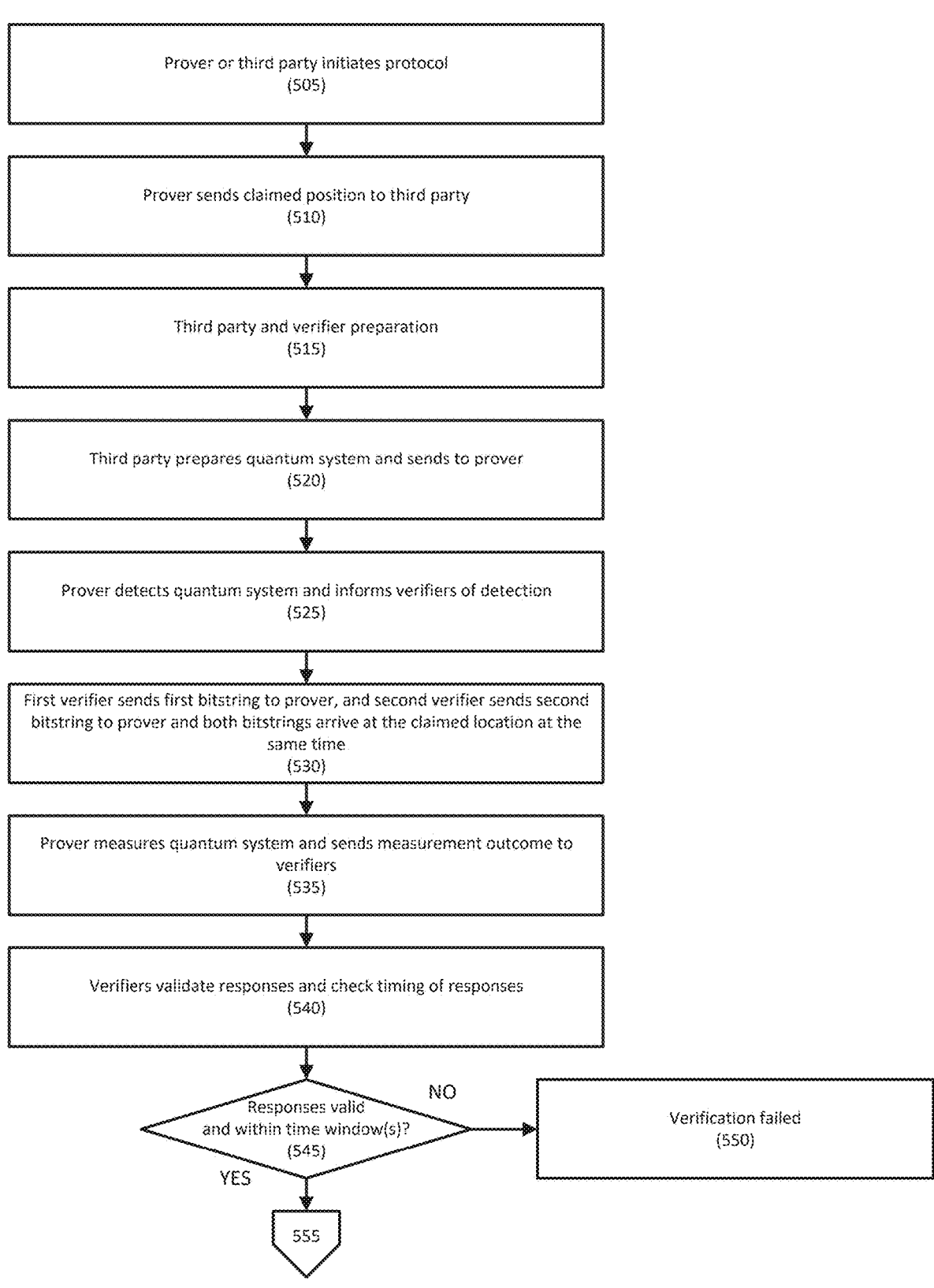
FIGS. 5A and 5B illustrate a method for quantum position-based key exchange using a location credential according to another embodiment.
Figure 5B:
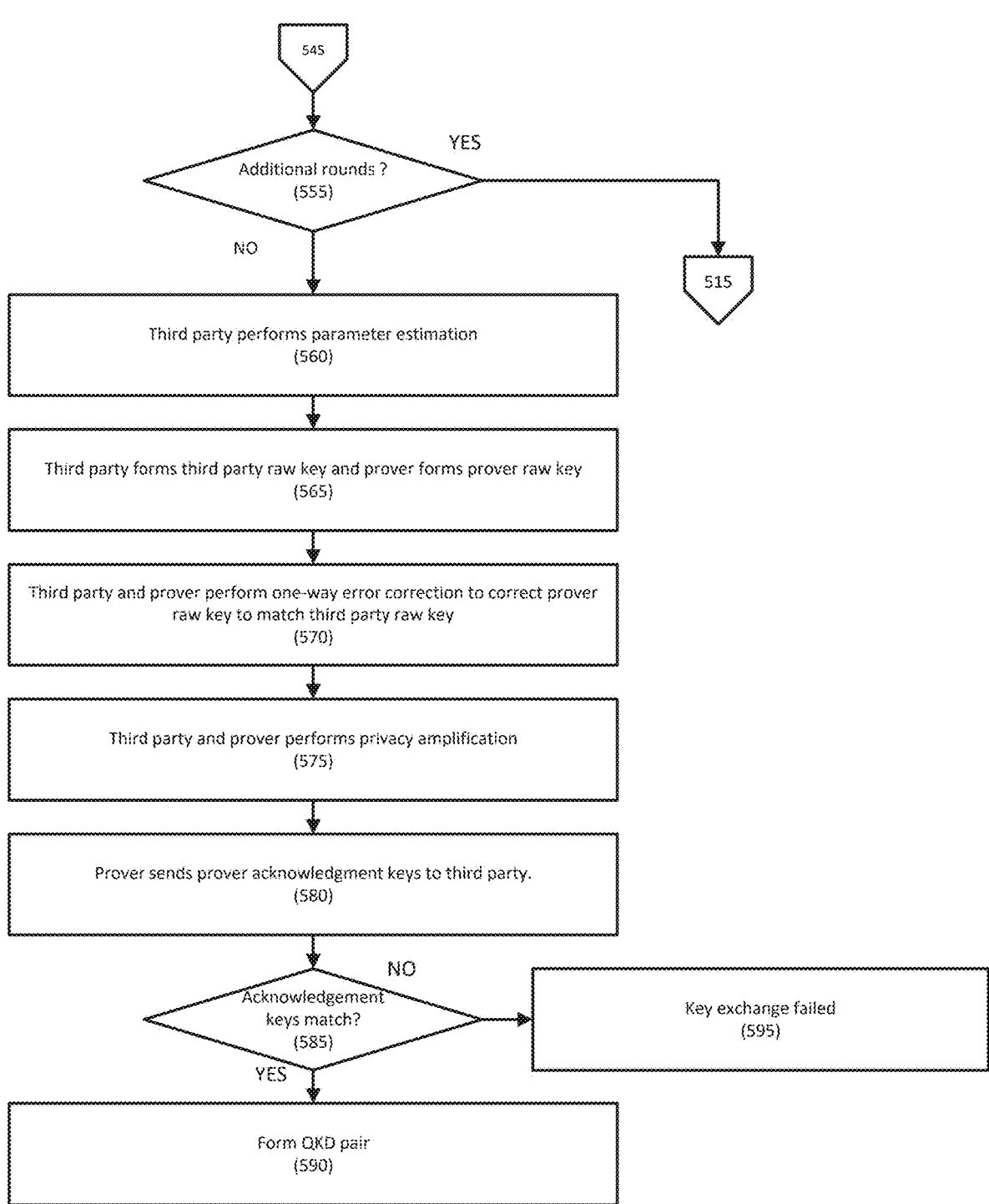

FIGS. 5A and 5B illustrate a method for quantum position-based key exchange using a location credential according to another embodiment.

In step 505, a prover or a third party may initiate a quantum position-based key exchange protocol using a location credential. For example, the initiating party may send a hello message to the target party (e.g., from the prover to the third party) to begin the protocol, and the target party may respond with a hello message to indicate that it is ready to begin the protocol.

In step 510, the prover may send its claimed position, P, to the third party.

In step 515, the third party and the first verifier may prepare for the protocol. For example, the third party may randomly generate two bitstrings, x' and y', as evaluation function inputs, and random bit value z for state preparation. The third party may send both bitstrings x' and y' to both a first verifier and a second verifier using a secure communication channel.

The third party may also inform both the first verifier and the second verifier of the time that bitstrings x' and y' should arrive at the claimed position.

The first verifier may compute the time that it should send the first bitstring x' to the prover, and the second verifier may compute the time that it should send the second bitstring y' to the prover.

In step 520, the third party may prepare a quantum system and send to the prover. For example, the third party may compute the basis, $\theta$, from the evaluation function using the bitstrings, $(\theta, T) = f'(x', y')$, and may prepare a quantum system Q with the computed basis and the bit value z. The quantum system may be prepared in the BB84 state. The quantum system may then be sent to the prover via a quantum channel such that it arrives before messages from the first verifier and the second verifier.

In step 525, the prover may detect the quantum system and may inform the first verifier and the second verifier of the detection. For example, the prover may perform a measurement to check if the quantum system has been received (e.g., whether quantum system Q has arrived or is lost). The prover may inform the first verifier and the second verifier whether it has received the quantum system. The prover may keep the quantum system in its quantum memory.

In another embodiment, the third party may prepare a quantum system Q in the BB84 state with a fixed or random basis and bit value z.

In step 530, the first verifier sends the first bitstring x' to the prover via a communication channel supporting one-way authentication, and the second verifier sends the second bitstring y' to prover via a communication channel supporting one-way authentication, and both arrive at the claimed position at the same time.

In step 535, the prover may measure the quantum system Q and may record the measurement outcome. For example, the prover may measure the quantum system with the first bitstring x' and the second bitstring y' and may respond to the first verifier and the second verifier with the measurement outcome.

In one embodiment, the prover may compute the basis and testing parameter using the evaluation function and the two bitstrings $[(\theta, T)=f'(x', y')]$. It may measure the quantum system Q in the computed basis $\theta$, and may record the outcome z'.

If no detection is made, the prover may send a "no detection" message to the first verifier and the second verifier immediately/quickly.

If the testing parameter indicates a test round (e.g., T=1), the prover may send the measurement outcome z' to both verifiers immediately/quickly.

If the testing parameter indicates a key generation round (e.g., T=0), the measurement outcome is not sent.

In step 540, the first verifier and the second verifier may validate the responses and may check the timing of responses. For example, during each step of the protocol, the first verifier and the second verifier may record the arrival time of the respective responses. The first verifier and the second verifier may forward the responses and timing information to the third party via a secure communication channel. The third party may check if the responses and timings are valid, such as (1) by checking that the responses received by the two verifiers match, (2) by checking that the responses match the testing parameter and detection response, and (3) by checking that the responses fall within an expected time window, which may be based on the claimed position of the prover.

If, in step 545, any checks fail, then in step 550, the verification may fail.

If the responses are valid and received within the expected time window(s), and in step 555, the number of rounds does not exceed a target number, the process may return to step 515, where the first verifier may prepare a second quantum system.

If the number of rounds exceed a target number, in step 560, the third party may perform parameter estimation. For example, based on the responses received in the test rounds, the third party may check to see if (1) the error rates are within some tolerance value, (2) the transmission rates are balanced between test and key generation rounds, and (3) the overall loss is within some tolerance value. If any checks fail, the protocol aborts.

In step 565, the third party may form a third party raw key, and the prover may form a prover raw key. For example, the third party may collect the bit values z of the key generation rounds where a detection is made into a third party raw key, $S_C$, while the prover collects its measurement outcomes z' of the key generation rounds where a detection is made into a prover raw key $S_P$.

In step 570, the third party and the prover may perform one-way error correction to correct the prover raw key $S_P$ to match third party raw key $S_C$. For example, the third party may compute a syndrome, $$syn = f_{syn}^{enc}(S_C)$$

and may send the syndrome to the prover via a communication channel supporting one-way authentication, followed by the prover computing a corrected prover key using the syndrome, $$\hat{S}_P = f_{syn}^{dec}(S_P, syn).$$

In step 575, the third party and prover may perform privacy amplification. For example, the third party may generate a random extractor seed $K_{ext}$ and may forward it to the prover via a communication channel supporting one-way authentication. The third party may perform privacy amplification and may compute a third party secret key and third party acknowledgment key from the third party raw key using the privacy amplification function, $(K_C, ack_C)=f_{PA}(K_{ext}, S_C)$.

The prover may perform privacy amplification and may compute a prover secret key and prover acknowledgment key from the corrected prover key using the privacy amplification function, $(K_P, ack_P)=f_{PA}(K_{ext}, \widehat{S_P})$.

In step 580, the prover may send the prover acknowledgment key to the third party to indicate that it has successfully generated the prover secret key.

In step 585, the third party may check if the prover acknowledgement key matches the third party acknowledgement key. If they match, in step 590, the verifier secret key and the prover secret key form a QKD key pair. Both parties know that the third party and prover secret keys match and are secure.

If the acknowledgement keys do not match, in step 595, the key exchange may fail.

Figure 6:
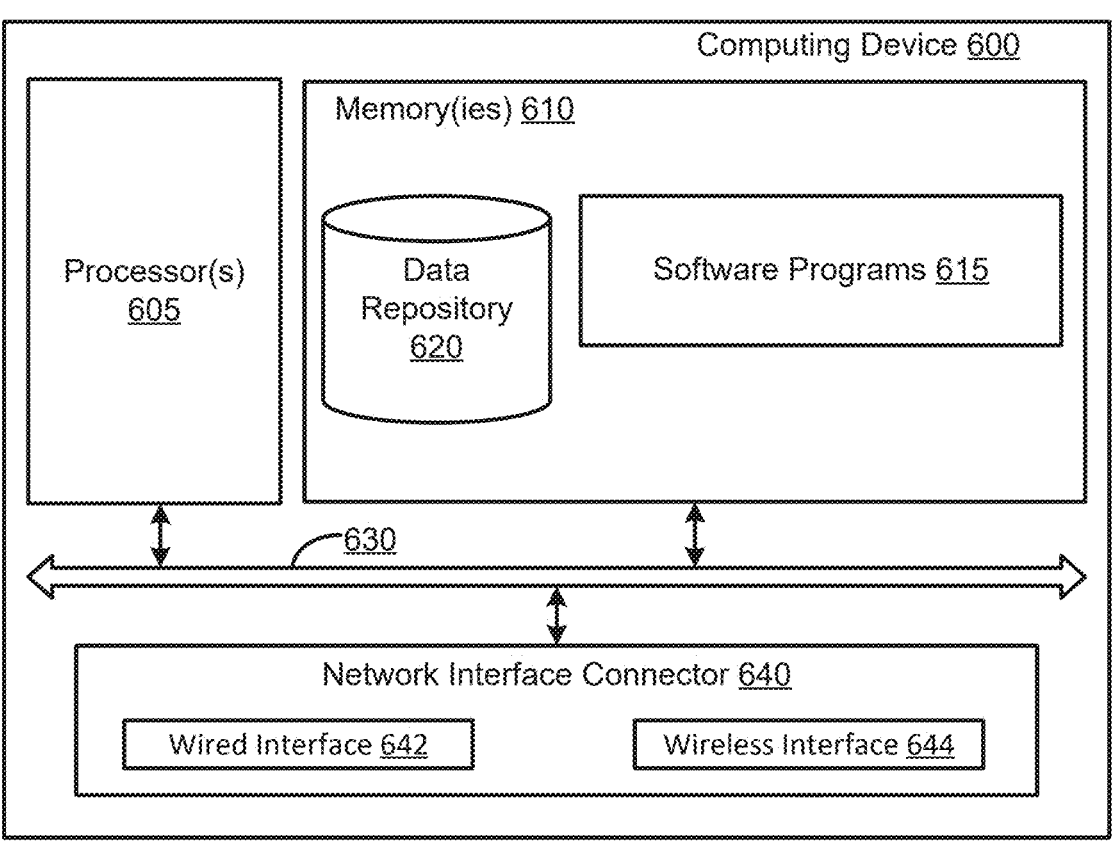
FIG. 6 depicts an exemplary computing system for implementing aspects of the present disclosure.

FIG. 6 depicts an exemplary computing system for implementing aspects of the present disclosure. FIG. 6 depicts exemplary computing device 600. Computing device 600 may represent the system components described herein. Computing device 600 may include processor 605 that may be coupled to memory 610. Memory 610 may include volatile memory. Processor 605 may execute computer-executable program code stored in memory 610, such as software programs 615. Software programs 615 may include one or more of the logical steps disclosed herein as a programmatic instruction, which may be executed by processor 605. Memory 610 may also include data repository 620, which may be nonvolatile memory for data persistence. Processor 605 and memory 610 may be coupled by bus 630. Bus 630 may also be coupled to one or more network interface connectors 640, such as wired network interface 642 or wireless network interface 644. Computing device 600 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories.

However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:

receiving, by a first verifier electronic device, a request for position verification comprising a claimed position from a prover electronic device;

randomly generating, by the first verifier electronic device, a first bitstring and a second bitstring;

sending, by the first verifier electronic device, the first bitstring and the second bitstring to a second verifier electronic device;

preparing, by the first verifier electronic device, a quantum system using a computed basis from an evaluation function, the first bitstring, and the second bitstring;

sending, by the first verifier electronic device, the quantum system to the prover electronic device;

sending, by the first verifier electronic device, the first bitstring to the prover electronic device, wherein the second verifier electronic device is configured to send the second bitstring to the prover electronic device such that the first bitstring and the second bitstring are sent to arrive at the claimed position at the same time;

validating, by the first verifier electronic device, a response received from the prover electronic device;

confirming, by the first verifier electronic device, that the response was received within an expected time window, wherein the expected time window is based on the claimed position of the prover electronic device;

wherein the first verifier electronic device rejects the request in response to the response being not valid or the response being received outside of the expected time window.

2. The method of claim 1, further comprising:

performing, by the first verifier electronic device and with the second verifier electronic device, parameter estimation, wherein the parameter estimation comprises estimating an error rate and a loss.

3. The method of claim 1, further comprising:

generating, by the first verifier electronic device, a first verifier raw key;

generating, by the prover electronic device, a prover raw key;

performing, by the first verifier electronic device and the prover electronic device, one-way error correction based on the first verifier raw key and the prover raw key;

obtaining, by the first verifier electronic device, a first verifier secret key and a first verifier acknowledgement key from the first verifier raw key; and obtaining, by the prover electronic device, a prover secret key and a prover acknowledgement key from the prover raw key.

4. The method of claim 3, further comprising:

sending, by the prover electronic device, the prover acknowledgement key to the first verifier electronic device; and forming, by the first verifier electronic device and the prover electronic device, a key pair from the first verifier secret key and the prover secret key in response to the prover acknowledgement key matching the first verifier acknowledgement key.

5. The method of claim 1, wherein the prover electronic device measures the quantum system in a basis computed from the first bitstring and the second bitstring using the evaluation function and sends the measurement outcome to the first verifier electronic device and the second verifier electronic device.

6. The method of claim 1, wherein the quantum system further comprises a phase-randomized BB84 state with no correlation between different photon numbers.

7. The method of claim 1, further comprising:

randomly generating, by the first verifier electronic device, a random bit value, wherein the random bit value is used to prepare the quantum system.

8. A method, comprising:

receiving, by a third party electronic device, a request for position verification comprising a claimed position from a prover electronic device;

randomly generating, by the third party electronic device, a first bitstring and a second bitstring;

sending, the third party electronic device, the first bitstring and the second bitstring to a first verifier electronic device and a second verifier electronic device;

preparing, by the third party electronic device, a quantum system using a computed basis from an evaluation function, the first bitstring, and the second bitstring;

sending, by the third party electronic device, the quantum system to the prover electronic device;

sending, by the first verifier electronic device, the first bitstring to the prover electronic device;

sending, by the second verifier electronic device, the second bitstring to the prover electronic device, wherein the first bitstring and the second bitstring are sent to arrive at the claimed position at the same time;

validating, by the first verifier electronic device and the second verifier electronic device, a response received from the prover electronic device; and confirming, by the first verifier electronic device with the second verifier electronic device, that the response was received within an expected time window, wherein the expected time window is based on the claimed position of the prover electronic device;

wherein the first verifier electronic device rejects the request in response to the response being invalid or the response being received outside of the expected time window.

9. The method of claim 8, further comprising:

determining, by the third party electronic device, that an error rate is within a tolerance value.

10. The method of claim 8, further comprising:

generating, by the third party electronic device, a third party raw key;

generating, by the prover electronic device, a prover raw key;

performing, by the third party electronic device and the prover electronic device, one-way error correction based on the third party raw key and the prover raw key;

obtaining, by third party electronic device, a third party secret key and a third party acknowledgement key from the third party raw key; and obtaining, by the prover electronic device, a prover secret key and a prover acknowledgement key from the prover raw key.

11. The method of claim 10, further comprising:

sending, by the prover electronic device, the prover acknowledgement key to the third party electronic device; and forming, by the third party electronic device and the prover electronic device, a key pair from the third party secret key and the prover secret key in response to the prover acknowledgement key matching the third party acknowledgement key.

12. The method of claim 8, wherein the prover electronic device measures the quantum system in a basis computed from the first bitstring and the second bitstring using the evaluation function and sends the measurement outcome to the first verifier electronic device and the second verifier electronic device.

13. The method of claim 8, further comprising:

randomly generating, by the third party electronic device, a random bit value, wherein the random bit value is used to prepare the quantum system.

14. A system, comprising:

a first verifier electronic device executing a first verifier computer program;

a second verifier electronic device executing a second verifier computer program; and a prover electronic device executing a prover computer program;

wherein:

the first verifier computer program is configured to receive a request for position verification comprising a claimed position from the prover computer program;

the first verifier computer program is configured to randomly generate a first bitstring and a second bitstring;

the first verifier computer program is configured to send the first bitstring and the second bitstring to the second verifier computer program;

the first verifier computer program is configured to prepare a quantum system using a computed basis from an evaluation function, the first bitstring, and the second bitstring;

the first verifier computer program is configured to send the quantum system to the prover computer program;

the first verifier computer program is configured to send the first bitstring to the prover computer program;

the second verifier computer program is configured to send the second bitstring to the prover computer program, wherein the first bitstring and the second bitstring are sent to arrive at the claimed position at the same time;

the first verifier computer program and the second verifier computer program are configured to validate a response received from the prover computer program; and the first verifier computer program and the second verifier computer program are configured to verify that the response was received within an expected time window;

wherein the first verifier computer program or the second verifier computer program is configured to reject the request in response to the response being not valid or the response being received outside of the expected time window.

15. The system of claim 14, wherein the first verifier computer program and the second verifier computer program are configured to perform parameter estimation, wherein the parameter estimation comprises estimating an error rate and a loss.

16. The system of claim 14, wherein:

the first verifier computer program is configured to generate a first verifier raw key;

the prover computer program is configured to generate a prover raw key;

the first verifier computer program and the prover computer program are configured to perform one-way error correction based on the first verifier raw key and the prover raw key;

the first verifier computer program is configured to obtain a first verifier secret key and a first verifier acknowledgement key from the first verifier raw key; and the prover computer program is configured to obtain a prover secret key and a prover acknowledgement key from the prover raw key.

17. The system of claim 16, wherein:

the prover computer program is configured to send the prover acknowledgement key to the first verifier computer program; and the first verifier computer program and the prover computer program are configured to form a key pair from the first verifier secret key and the prover secret key in response to the prover acknowledgement key matching the first verifier acknowledgement key.

18. The system of claim 14, wherein:

the prover computer program is configured to measure the quantum system in a basis computed from the first bitstring and the second bitstring using the evaluation function; and the prover computer program is configured to send the measurement outcome to the first verifier computer program and the second verifier computer program.

19. The system of claim 14, wherein the first verifier computer program is configured to randomly generate a random bit value, wherein the random bit value is used to prepare the quantum system.

20. The system of claim 14, wherein the quantum system further comprises a phase-randomized BB84 state with no correlation between different photon numbers.

* * * * *